Nov. 22, 1938.  W. D. BRADFORD  2,137,892
FURNACE
Filed June 17, 1937

Inventor
William D. Bradford
By Frease and Bishop
Attorneys

Patented Nov. 22, 1938

2,137,892

UNITED STATES PATENT OFFICE 2,137,892

FURNACE

William D. Bradford, Canton, Ohio, assignor, to Barium Stainless Steel Corporation, Canton, Ohio, a corporation of Delaware Application June 17, 1937, Serial No. 148,756

3 Claims. (Cl. 263—15)

The invention relates primarily to open hearth furnaces and more particularly to the construction and operation of an improved open hearth furnace for making stainless iron and steel.

Stainless iron and steel can not be made satisfactorily according to present practices in an ordinary open hearth furnace because of the strongly oxidizing atmospheric conditions existing therein. In a prior pending application for Method of making stainless steel, filed May 13, 1937, jointly by myself and Roy F. Lab, there is disclosed a novel method by which stainless steel is made satisfactorily in an open hearth furnace, using coal burning gas producers.

The present invention has for its general object the economical production of high quality stainless steel in an open hearth furnace, using natural or artificial gas for fuel instead of coal.

Another object of the present invention is to provide an improved open hearth furnace construction adapted for producing stainless steel.

More specific objects include the provision of an open hearth furnace in which fuel gas is preheated at the burner port.

A further object is to provide a small amount of primary air for preliminary partial reforming of the gas while it is being preheated and before the same is mixed with the incoming heated air for combustion.

Another object is to provide a chamber for intermixing the preheated partially reformed gas and the incoming heated air before either the gas or the air reaches the hearth of the furnace.

A still further object is to provide a novel and improved method of burning fuel gas in an open hearth furnace for controlling atmospheric conditions in the furnace.

And finally it is an object of the present invention to provide a novel and improved furnace construction and method of operation for efficiently and economically producing stainless steel in a relatively short period of time.

These and other objects are accomplished by the improvements, combinations, arrangements and methods of operation comprising the present invention which can be stated in general terms as including the provision of a burner tunnel into which the fuel gas and a small amount of primary air are introduced, and around which the incoming heated air for combustion circulates, there being a combustion and mixing chamber between the burner tunnel and the furnace hearth in which the preheated partially reformed gas and the heated air are intermixed.

Referring to the drawing forming part hereof;

Similar numerals refer to similar parts throughout the several views of the drawing, which are more or less diagrammatic for the sake of clearness.

Figure 1:
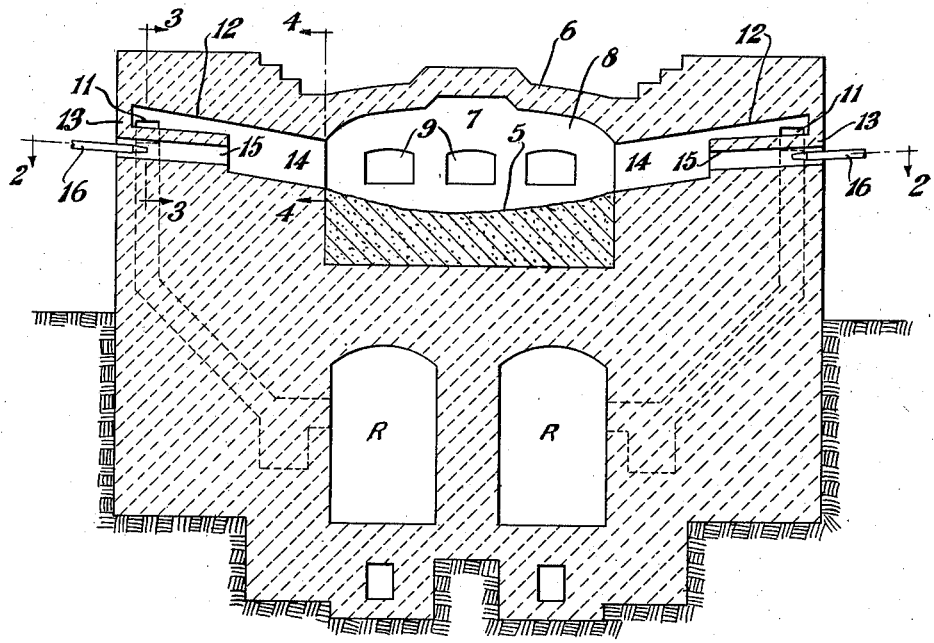
Figure 1 is a sectional view looking toward the charging side of an improved open hearth furnace for carrying out the present invention.
Figure 2:
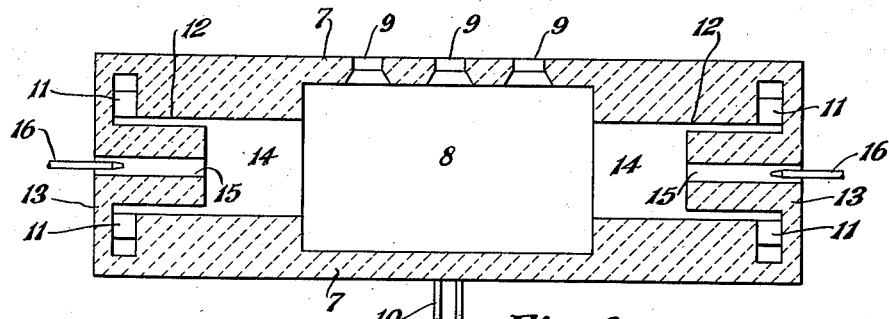
Fig. 2 is a plan sectional view substantially on line 2—2, Fig. 1.

The following description of the construction and operation of the improved furnace is by way of example, and various modifications therein may be made without departing from the invention as defined in the claims.

I have successfully made stainless steel in an open hearth furnace such as is shown in the drawing and described herein, using natural gas for fuel, but the invention may be applied to larger sizes or somewhat different types of furnaces, and the fuel may be artificial gas, as for instance coke oven gas.

As shown in the drawing, the furnace includes a hearth 5 having the usual arched roof 6 thereover, which together with side walls 7 form the melting chamber 8. One side wall is provided with the usual charging openings 9 and a tapping spout 10 may be located at the opposite side of the furnace.

The air for combustion is heated in the customary checker regenerator indicated at R below the furnace hearth, and adapted to be alternately connected with the air ports 11 at opposite ends of the furnace, according to usual open hearth practice.

The air ports 11 communicate with preferably downwardly inclined longitudinal hot air passages 12 preferably at the sides and above the burner tunnels 15, said passages leading to the mixing and combustion chambers 14 at the opposite ends of the furnace hearth 5 and communicating with the melting chamber 8. The air ports 11 communicate with the passages 12 at their outer ends and adjacent the furnace end walls 13 so that the heated air entering through the ports travels the full length of the passage before reaching the combustion and mixing chamber 14. The combustion and mixing chamber is indicated at 14.

The fuel gas, which may be natural gas, is introduced into either end of the furnace through a longitudinal burner tunnel 15 which extends from the outside end wall 13 the full length of the passage 12 approximately half way to the hearth 5. A burner pipe 16 extends a short distance into each tunnel 15 for introducing fuel gas thereinto, and the tunnel opening is somewhat larger than the burner pipe 16 so that a small amount of primary air is sucked into the tunnel by the gas issuing from the burner pipe to provide for partial or preliminary reforming of the gas within the tunnel. This partial reforming of the gas within the tunnel substantially prevents deposition of carbon on the tunnel walls.

The amount of primary air so introduced is not sufficient to support combustion but sufficient to prevent carbon deposition. Dampers or shutters around pipe 16 where it enters tunnel 15 may serve to control the amount of primary air admitted for the partial reforming of the gas while it is being preheated in its passage through tunnel 15.

Figure 3:
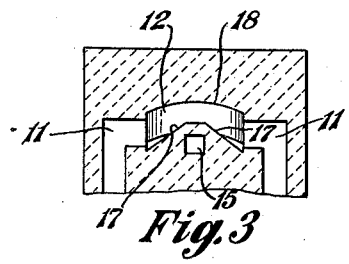
Fig. 3 is a fragmentary sectional view as on line 3—3, Fig. 1.
Figure 4:
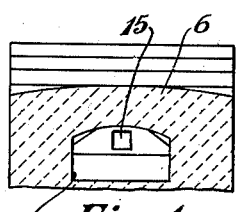
Fig. 4 is a fragmentary sectional view as on line 4—4, Fig. 1.

When one burner 16 is on, the burner at the other end is shut off, and heated air from one regenerator is led into the passage 12 surrounding the burner tunnel in which the gas is being partially preheated and partially reformed. The incoming heated air is deflected upwardly over and around the burner tunnel 15 by means of the upwardly inclined top walls 17 thereof and the arched roof 18 of the passage 12 (Fig. 3). Since the heated air must travel substantially the entire length of the burner tunnel before mixing with the gas issuing from the mouth of the burner tunnel, the burner tunnel walls are thereby heated so as to preheat the gas passing therethrough.

The heated air and preheated gas meet at the mouth of the burner tunnel 15, and begin to mix in the combustion chamber 14 in which combustion gets well under way before the gases reach the furnace hearth.

The fuel is believed to be the main constituent of the lowermost stratum and the hot air is believed to be the main constituent of the uppermost stratum of the gases issuing from the combustion chamber 14. As a result, combustion continues in the melting chamber between these strata and supplies the heat for melting, while the lower stratum, rich in gas, protects the metal on the hearth from oxidation.

The hot gaseous products of combustion from the furnace pass through the combustion chamber 14 at the opposite end of the furnace and out through passages 12 and down the passages 11 to preheat checkers in the other regenerator R for reversing the operation of the furnace. As these gases pass around the burner tunnel at the opposite end of the furnace, they serve to heat the burner tunnel almost to incandescence so that the same is very hot and in readiness for the gas to be introduced therein when the operation of the furnace is reversed.

I have found that with the present improved furnace construction and method of producing combustion therein, there are no cold spots at any part of the furnace hearth, and the atmospheric conditions in the furnace can be controlled to produce stainless steel of high quality, economically and in a relatively short time. Moreover, the analysis, character and yield of stainless steel produced in a furnace so constructed and operated indicates that the metal bath is protected from oxidation.

I claim:

1. Furnace construction including a melting chamber, walls forming a combustion chamber adjacent to the melting chamber, walls forming a downwardly inclined hot air passage communicating at its inner end with said combustion chamber, a gas burner tunnel closed throughout its length extending into said passage from outside the furnace and communicating at its inner end with said combustion chamber at a point spaced from the hearth whereby primary air and gas in the tunnel are partially re-formed within the tunnel, and said passage having air ports at its outer end for circulating heated air around said burner tunnel to preheat the gas and air being re-formed within the tunnel and to then mix in the combustion chamber with the preheated partially re-formed gas and air issuing from the tunnel.

2. Furnace construction including a hearth, walls forming a downwardly inclined hot air passage at one end of the furnace communicating with the hearth, a gas burner tunnel closed throughout its length extending into said hot air passage from outside the furnace and having its inner end communicating with the passage at a point spaced from the hearth, means for introducing heated air into the outer end of said air passage around the rear end of said burner tunnel, and means for introducing gas into said burner tunnel and for inducing a small amount of primary air therein, whereby the gas and primary air are preheated and partially re-formed within the burner tunnel and whereby said preheated partially re-formed gas and air mix with the heated air in the passage before being introduced into the furnace above the hearth.

3. Furnace construction including a hearth, walls forming a downwardly inclined hot air passage communicating at its inner end with the hearth, a combustion chamber forming the part of said hot air passage adjacent said hearth, a gas burner tunnel closed throughout its length extending into said passage from outside the furnace and terminating at said combustion chamber, means for introducing heated air for combustion into the outer end of said hot air passage around said burner tunnel, a burner pipe at the outer end of said burner tunnel for introducing gas therein, means for inducing a small amount of primary air into the tunnel around the pipe whereby the gas and primary air are partially re-formed and preheated within the tunnel, and whereby the partially re-formed gas and air are discharged into the combustion chamber to there mix with the hot air for combustion.

WILLIAM D. BRADFORD.